A. STOREY.
WASTE PIPE VALVE.
APPLICATION FILED JULY 14, 1908.

925,245.

Patented June 15, 1909.

Witnesses:
Joe. P. Wabler.

Inventor,
Arthur Storey,
By Victor J. Evans,
Attorney

UNITED STATES PATENT OFFICE.

ARTHUR STOREY, OF WARREN, MASSACHUSETTS.

WASTE-PIPE VALVE.

No. 925,245.      Specification of Letters Patent.      Patented June 15, 1909.

Application filed July 14, 1908. Serial No. 443,454.

*To all whom it may concern:*

Be it known that I, ARTHUR STOREY, a citizen of the United States of America, residing at Warren, in the county of Worcester and State of Massachusetts, have invented new and useful Improvements in Waste-Pipe Valves, of which the following is a specification.

This invention relates to a waste pipe valve designed for the purpose of discharging waste water from a wash bowl, bath tub or similar device, and one of the principal objects of the same is to dispense with the usual plug and chain connected to wash bowls and bath tubs and to provide means for closing the discharge opening in the basin or bath tub by a valve operated by means of a push rod having a button or head at its upper end.

Another object of the invention is to provide a valve for opening and closing the waste pipe and to provide simple means for operating the valve.

These and other objects may be attained by means of the construction illustrated in the accompanying drawing, in which,—

Figure 1:
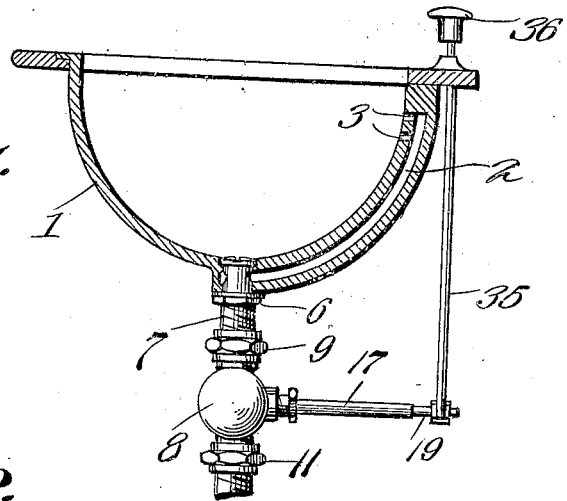
Figure 2:
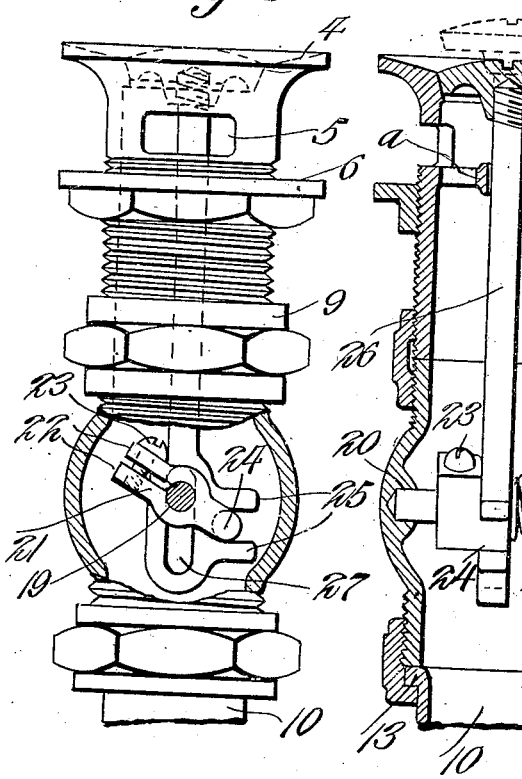
Figure 3:
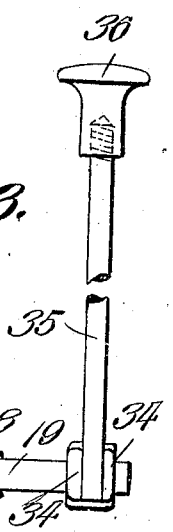
Figure 4:
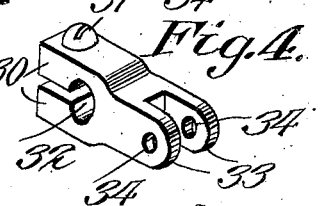

Figure 1 is a vertical section through a stationary wash bowl, and showing my valve connected thereto. Fig. 2 is a side elevation and partial section of my valve shown closed in dotted lines. Fig. 3 is a vertical sectional view of the valve shown closed in full lines and open in dotted lines. Fig. 4 is a detail perspective view showing a connecting device which is utilized for connecting the push rod to the operating rod of the valve.

Referring to the drawing, the numeral 1 designates the ordinary wash bowl having an overflow duct 2 communicating with the interior of the bowl near its upper end through perforations 3. Connected to the central discharge opening for the waste water is a valve seat 4, said valve seat having annular openings 5 which connect with the duct 2. The valve seat 4 is connected to the bowl 1 by means of a threaded nut 6 which engages a threaded portion 7 of the valve seat. Connected to the lower end of the threaded portion 7 is a ball casing 8, said casing being connected to the threaded portion 7 by means of a threaded ring 9, and connected to the lower end of the casing 8 is the discharge waste pipe 10, said pipe being connected to the casing 8 by means of a threaded ring 11 having a flange 12 which engages the flange 13 on the waste pipe.

The casing 8 is provided with an internally threaded boss 14 in which is fitted a gland 15 which is exteriorly threaded to fit the interior threads on the boss 14, and a suitable gasket 16 is disposed between the inner end of the gland 15 and the wall of the casing, as shown in Fig. 3. Fitted within the gland 15 is a tube 17 having a contracted outer end 18. Extending through the tube 17 is a valve-operating rod 19, said rod being pivoted at its inner end in a seat or socket 20 in the inner wall of the casing 8. Connected to the operating rod 19 is a clamp 21 provided with spring jaws 22 which are connected together by means of the screw 23, said screw extending through the jaws 22 to attach the clamp to the operating rod 19. A cross rod 24 on the clamp is disposed between the two fingers 25 formed upon the lower end of the valve stem 26. The valve stem 26 is provided with a slot 27 at its lower end through which the operating rod 19 extends, and upon the upper end of the valve stem 26 a suitable valve head 28 is removably connected. A washer $y$ is rigidly fixed to the rod 19, and a spring 29 is secured at one end to said washer, while the other end of said spring is secured to the casing. The tension of this spring is exerted to seat the valve 28.

Connected to the outer end of the operating rod 19 is a clamp provided with resilient jaws 30 through which a screw 31 passes. The operating rod 19 extends through an opening 32, and when the screw 31 is tightened the clamp is held firmly in position upon the rod 19. A pair of spaced lugs 33 formed upon the clamp is provided with register openings 34, by means of which the lower end of the push rod 35 is connected to the clamp upon one side of the operating rod 19. The push rod 35 extends through the top of the wash stand and is provided upon its upper end with a detachable push button 36.

The operation of my invention may be briefly described as follows:—Normally the valve 28 is seated by the spring 29. When it is desired to operate the valve to let out the waste water the rod 35 is operated by pulling upward upon the button 36 which partially rotates the operating rod 19 against the tension of the spring 29 and raises the valve stem 26 and unseats the valve 28, as shown in dotted lines in Fig. 3, the waste water then passing through the openings at the sides of the cross bar *a* and out through the waste pipe 10. Should it be desired to operate the valve by a push instead of by pulling upward upon the button 36, the clamp which connects the rod 35 with the operating rod 19 may be turned to the opposite side of the said operating rod 19, under which condition the button 36 could be pushed downward to operate the valve.

My invention is of simple construction, can be readily applied to any bath tub or wash bowl without material alteration in any of the parts, can be constructed at low cost and can be quickly attached.

I claim:—

A waste pipe valve comprising a casing, a valve seat, a valve, a stem connected to said valve, an operating rod journaled in the casing, a clamp connected to said operating rod, a cross rod connected to said clamp, fingers formed on the valve stem to engage said cross rod, a spring surrounding said operating rod, said spring being connected at one end to a washer surrounding said operating rod and at the other end to the valve casing, a push rod, and means for connecting said push rod at either side of said operating rod, in order that the device may be operated by pushing or pulling upon said rod.

In testimony whereof I affix my signature in presence of two witnesses.

ARTHUR STOREY.

Witnesses:
WM. E. HODGSON,
D. E. GRAVES.